United States Patent [19]

Saidla

[11] 4,073,840
[45] Feb. 14, 1978

[54] METHOD FOR FORMING A FIBER REINFORCED FOAM ARTICLE

[75] Inventor: Glen E. W. Saidla, Hampton Falls, N.H.

[73] Assignee: Exxon Research & Engineering Co., Linden, N.J.

[21] Appl. No.: 565,949

[22] Filed: Apr. 7, 1975

Related U.S. Application Data

[63] Continuation-in-part of Ser. No. 407,829, Oct. 19, 1973, abandoned.

[51] Int. Cl.$^2$ .............................................. B29D 27/04
[52] U.S. Cl. .............................. 264/45.3; 260/2.5 AK; 264/51; 264/DIG. 17
[58] Field of Search ...... 264/DIG. 17, 45.5, DIG. 14, 264/321, 51; 259/25, 182, DIG. 24; 260/2.5 AK

[56] References Cited

U.S. PATENT DOCUMENTS

| | | | |
|---|---|---|---|
| 1,952,638 | 3/1934 | Taylor | 259/25 X |
| 2,764,566 | 9/1956 | Simon et al. | 264/DIG. 17 |
| 2,855,021 | 10/1958 | Hoppe | 264/DIG. 17 |
| 3,099,516 | 7/1963 | Henrickson | 264/DIG. 14 |
| 3,182,104 | 5/1965 | Cwik | 264/45.5 X |
| 3,256,218 | 6/1966 | Knox | 264/DIG. 17 |
| 3,443,007 | 5/1969 | Hardy | 264/321 |
| 3,608,008 | 9/1971 | Soukup et al. | 264/45.5 |
| 3,843,100 | 10/1974 | Haas et al. | 259/25 |

FOREIGN PATENT DOCUMENTS

| | | | |
|---|---|---|---|
| 2,218,418 | 4/1972 | Germany | 259/182 |

OTHER PUBLICATIONS

Stewart, S. A., "Metering and Mixing Equipment for the Production of Urethane Foam Products," DuPont Bulletin: HR-32, Sept. 1958, Wilmington, Del., E. I. Du Pont de Nemours & Co., Inc., Elastomer Chemicals Dept., 1958, pp. 3-6 and 14-16.

*Primary Examiner*—Philip Anderson
*Attorney, Agent, or Firm*—Joseph J. Dvorak

[57] ABSTRACT

A fiber reinforced foam having a predetermined uniform distribution of fibers throughout the skin and core is prepared by slurrying fibers with a major component of a foamable resin composition, thereafter adding the balance of the components necessary to form a foamable composition and allowing the so formed composition to foam under controlled temperatures and pressures.

8 Claims, 1 Drawing Figure

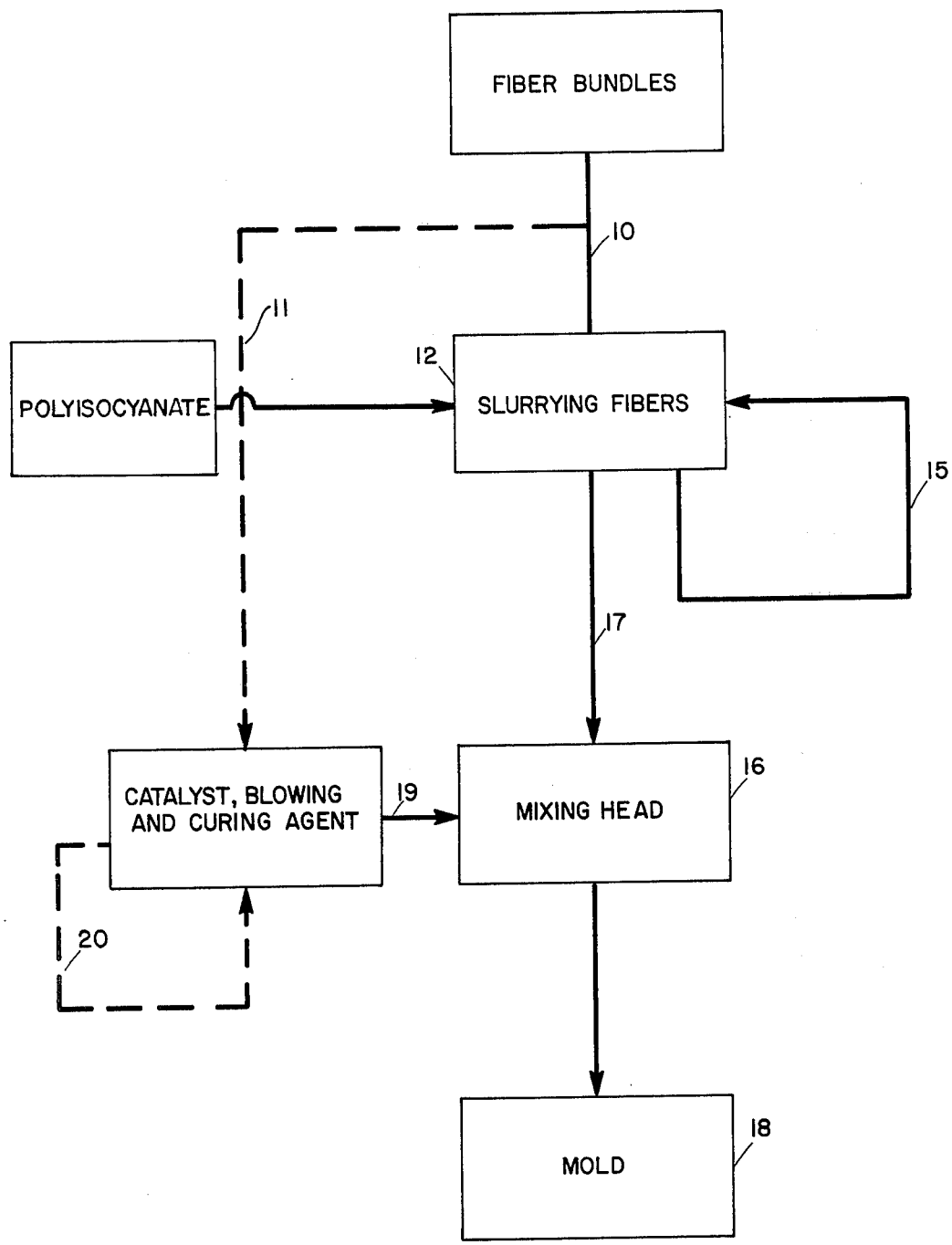

METHOD FOR FORMING A FIBER REINFORCED FOAM ARTICLE

CROSS REFERENCES

This applicaton is a continuation-in-part of co-pending application, U.S. Ser. No. 407,829, filed Oct. 19, 1973 and now abandoned.

BACKGROUND OF THE INVENTION

The present invention is directed toward fiber-reinforced plastic foam structures. More particularly, the present invention is concerned with a novel method for preparing novel fiber-reinforced foamed articles having a predetermined distribution of fibers throughout a foamed article.

A wide variety of materials have been added to foamed compositions to alter the properties of the foams for any one of a number of different reasons. Typically, fibers are added to foam compositions to increase the mechanical strength of the foam.

In some instances, it is desirable to have randomly oriented fibers distributed throughout a foam article as uniformly as possible. In the past, substantially uniform distribution of fibers in foam articles has not been achieved in any simple and economic manner, especially at fiber loadings above about 5 weight percent. Typically, a mold is loaded with randomly dispersed fibers and then a foamable resin mixture is added. During foaming, however, a substantial amount of the fibers are displaced from their original position with the end result that the fibers are not uniformly dispersed throughout the foam article and, for this and other reasons, the desired improvement in properties is not obtained.

In another technique a fiber-reinforced foam is fabricated by impregnating a non-woven batting of fibers with a foamable mixture. This technique suffers from the disadvantage that it is virtually impossible to adequately impregnate all the spaces between the fibers of the batting with a foamable mixture, again resulting in article of relatively low mechanical strength.

Foam articles have also been reinforced with woven fibers by bonding sheets of fabric to the exterior surfaces of a cellular foam article or by foaming a foamable composition between sheets of fabric. The strength characteristics of these cellular laminates are limited to a considerable extent upon the quality of the bond between the core and skin.

Spray techniques in which a foamable resin and fibers are sprayed onto a surface or substrate are not suitable for fabricating articles of any practical thickness. Indeed, such techniques are not at all applicable to the formation of structural foams, i.e. foams with low density cores and high density integral skins.

Mention should also be made of attempts to add fiber reinforcements to foam compositions during "cream time", i.e. when the foam starts to rise. Samples prepared in this manner will not have a predetermined uniform distribution of the fibers throughout the foam. Basically, it is extremely difficult, if not virtually impossible, to get reasonable fiber loadings mixed with the foam composition during the cream time.

These and other deficiencies of the foregoing fabrication techniques are well known.

SUMMARY OF THE INVENTION

According to the present invention, there is provided a method of forming a fiber-reinforced foam article which has a predetermined distribution of randomly oriented stable fiber filaments throughout the foam article and which has a substantially uniform weight ratio of fiber filaments to foam material throughout.

In its simplest sense, a fiber-reinforced foam article of the present invention is prepared by substantially homogeneously dispersing discrete reinforcing fiber filaments, such as glass fiber filaments, in a foamable resin composition prior to the foaming of the composition. This dispersion is achieved by: (a) adding the fibers, such as fiber bundles, to at least one major component of the foamable resin composition, i.e. a precursor of a foamable resin composition, thereby forming a fiber slurry; (b) mixing the fiber slurry for a time sufficient to separate at least some of the fibers from the fiber bundles into discrete fiber filaments and to wet so separated fibers and residual fiber bundles with the precursor; (c) intimately mixing the separated, and precursor-wet fiber filaments with the balance of the components necessary to form a foamable resin composition, whereby the fibers are substantially homogeneously dispersed in the foamable resin composition; and (d) thereafter allowing the foamable resin composition to foam in an appropriate mold.

In one embodiment of the present invention the foamable resin composition is a thermoset resin composition; indeed, a foamable polyurethane resin composition is particularly preferred.

Other appropriate foamable resin compositions contemplated by the present invention include phenol-aldehyde and urea-aldehyde resins, polyester resins, polyolefin resins, and natural and synthetic elastomers and the like.

Typically, the reinforcing fibers are added to at least one major component of a foamable resin composition in an amount sufficient to achieve a concentration of fibers in the resultant foamed article above about 1% by weight and preferably above about 1% by weight.

The balance of the resin components necessary to form a foamable resin composition typically include catalysts, surfactant, foam stabilizers, curing agents and the like.

In one aspect, the present invention contemplates a novel method for forming fiber-reinforced thermoset resin structure having a foam core and an integral skin with randomly oriented staple fiber filaments distributed through the structure such that the weight ratio of fibers to thermoset resin at any point within the structure is substantially uniform. The concentration of fibers in the structure is at least 1 wt. % and preferably in the range of 10 to about 50 wt. %.

In another aspect of the present invention, there is provided the utilization of an apparatus for fabricating, in a single step, foamed structural materials having fiber-reinforced integral skins. The apparatus comprises pumping means adapted to circulate and mix discrete fiber filaments with a resin foam precursor without destroying the integrity and length of the discrete fiber filaments. The apparatus includes advancing cavity or similar pump means for pumping the suspensions of the fiber in the resin precursor. Also included is static mixing head means for mixing the fiber suspension with the balance of the components of the foamable resin composition such as the curing agent, catalyst and blowing agent. And finally, mold means are provided for limiting the thickness of the foamable resin mixture. The mold means, of course, communicate with the mixing heat means. Mold means also include means for maintaining the temperature and pressure within the mold at the desired levels for the article being produced.

These and other embodiments of the present invention will become more apparent upon reading the detailed description of the invention which follows.

BRIEF DESCRIPTION OF DRAWING

The invention will be further described with reference to the drawing which schematically illustrates a typical flow plan in performing the process of the instant invention.

DETAILED DESCRIPTION

The practice of this invention contemplates the formation of a foamed article having a fiber-reinforcement throughout the foam article. Particularly contemplated is the formation of a fiber-reinforced foamed resin having a low density core and a high density integral skin. Hence, any thermosetting resin composition that may be foamed or expanded can be used in the practice of the present invention. Examples of suitable thermosetting resins that can be incorporated in foamable resin compositions include phenolaldehyde resins, urea-aldehyde resins, epoxy resins and polyurethanes.

The above-mentioned resins are readily prepared from commercially available polymer precursors by well-known techniques. For example, the polyurethane resins are prepared by polymerizing polyols and polyisocyanates, polyesters by polymerizing polycarboxylic acids and polyols. Additionally, many of these resins are available in the form of prepolymers which, with the addition of a cross-linking or curing agent and/or a suitable catalyst, can be further polymerized into a plastic resin article. Thus, the monomers, polymers and prepolymer materials constitute a major component or precursor of a foamable resin composition. Cross-linking or curing agents constitute another major component of such resin compositions. For example, in the case of a polyester resin composition, one major component of the composition is a polycarboxylic acid such as a dicarboxylic acid and another major component is a polyalcohol such as a diol. In the case of a polyurethane, each of a polyisocyanate and a polyol is a major component of the resin composition. Alternatively, a prepolymer, such as a polyisocyanate, may constitute the major resin component and a polyol cross-linking or curing agent such as those based on sorbitol and sucrose may constitute a second major component of the resin composition.

The resin compositions are rendered foamable by well-known techniques. For example, a blowing agent may be added to or incorporated in the liquid resin composition. The blowing agent may be a compound, which will liberate a gas by chemical reaction upon heating, or it may be a liquid which will vaporize on heating or on the reduction of pressure to effect foaming. The blowing agent may even be a gas. Typical blowing agents include hydrocarbons, such as pentane and the fluorocarbons, solid gas liberating compounds, such as azo and hydrazo compounds, carbonates and bicarbonates, and gases such as nitrogen and carbon dioxide.

Other ingredients which may be included in foamable resin compositions include catalyst, hardener, plasticizers, foam stabilizers, color pigments, flame retarders and the like. These materials are all well known. For example, catalysts for polymerizing the resin monomers are those well known in the art and illustrated by amines, polyamines, tin salts, organic tin compounds and the like typically used to catalyze the polymerization of polyisocyanates and polyols to polyurethanes, acids and bases typically used in forming polyesters, etc.

In the practice of the present invention, the choice of the specific resin as well as the formulation of the foamable resin composition will depend upon the use to which the foam is to be put. Indeed, it is well known that the characteristics of a foam resin, i.e. whether the foam is rigid or flexible, open or closed celled, skinless or with an integral skin, can largely be controlled by well-known techniques involving chemical changes in the formulation, composition and physical processing conditions. Moreover, there is an enormous selection of commercially available formulations of liquid systems that will provide an equally wide range of properties for the resultant foams. For example, rigid polyurethane foam systems are commercially available as two component systems. One component consists of the isocyanate component which typically is based on toluenediisocyanate or 4,4'-diphenylmethanediisocyanate. The second component contains polyol blends including catalyst, blowing agent, surface active agent and the like. Specific systems are chosen for the desired density, cell structure, rigidity, etc. of the resultant foam.

In addition to variations in formulations to effect foam density, skin formation, and other foam properties, temperature of the molds and processing pressures, for example, can be varied to effect the formation of integral skins. Thse techniques also are well known in the art.

In order to form a fiber-reinforced foam article with a predetermined distribution of fiber filaments in the foam, a foamable composition and process conditions compatible with such predetermined distribution must be selected. For example, if the fiber filaments are to be distributed uniformly throughout the foam, the foam compositon and process conditions should be selected which will produce a uniformly dense foam. On the other hand, if one wishes to produce a foam in which the fiber filaments are predominantly located in a dense integral skin, and the foam composition and process conditions chosen must be those which will produce an integral skin or structural foam.

The fibrous phase which is employed in the practice of the present invention can be selected from a broad range of fibers including materials such as glass, carbon, graphite, metal, boron fibers and the like. However, in the practice of the present invention it is particularly preferred to use chopped glass fibers. The glass fibers can be almost any length; however, they will generally not exceed three inches in length, and indeed, they generally range in length from about one-eighth to one inch. The fibers can be chopped from individual filaments or bundles of fibers may be used. Indeed, the method of the present invention is particularly well suited to use bundles of glass fibers. Glass fiber bundles, consisting of about 260 filaments per bundle, are commercially available in staple lengths.

The amount of fiber that is employed in the practice of the present invention depends upon the fiber itself and the desired strength of the foam material being fabricated. For example, graphite fibers have been known to impart considerable strength to plastic resins.

Thus, less graphite fiber reinforcing material would be required to reach a given strength than if glass fibers were employed. In general, however, the amount of fiber employed based on the amount of resin foamed is generally greater than 1%. Indeed, when glass fibers are used it is preferred to use from 10 to 50 wt. % of glass fibers based on the total weight of the foam article. Within these parameters, of course, it is understood that mixtures of fibers can be employed where it is desired for reasons of strength, economics, etc. to use such mixtures.

In order to assure that the fiber-reinforced foam article will have the predetermined distribution of fibers in the foam and the substantially uniform weight ratio of fibers to foam material throughout the article, it is essential that the fibers are substantially homogeneously dispersed in at least one major component of a foamable composition prior to adding the balance of components necessary to render the resin composition foamable. Indeed, at least some of the fibers must be separated from the fiber bundles into discrete, randomly oriented fiber filaments. As will be readily appreciated, these separated and randomly oriented fiber filaments at even moderate loadings of fibers in the resin, will be intertwined thereby contributing significantly to the mechanical strength of the ultimate foam article. The requisite separation of fibers is achieved by substantially homogeneously dispersing the fibers bundles in at least one major component of a foamable composition prior to adding the balance of components necessary to render the composition foamable. Thus, the fiber is added to at least one major resin component selected from monomers, prepolymers and curing agents to form a fiber slurry. The fiber slurry is mixed by pumping the material from a main holding tank through a recirculating line. Mixing is continued for a time sufficient for the major component to substantially wet the fibers and to separate the fibers into discrete randomly oriented fiber filaments. Mixing time is generally from about 1 minute to about 15 minutes and preferably from about 3 minutes to 6 minutes. The pumping is done with an advancing cavity type pump, or with a hydraulic ram or plunger. This pump type mixing separates fibers from the fiber bundles into discrete fiber filaments while maintaining their structural integrity. Filaments are uniformly dispersed without being broken.

The separation of fibers from the bundles into discrete fiber filaments can be visually observed. It is also accompanied by a substantial increase in the viscosity of the slurry and, hence, it can be physically measured. However, measurement has not been necessary. Similarly, the wetting of the fibers is visually observable and evidenced by a change in the fibers from opaque to generally translucent.

Returning to the method of this invention, the fiber slurry is metered and mixed, for example by means of a static mixing head, with a mixture of catalyst, foam stabilizer, curing and blowing agents, i.e. the balance of components necessary to form a foamable resin composition. Basically, the static mixers divide a stream into multiple layers and then recombine the layers in such a manner as to increase the interface between the layers. Typical interfacial generators are disclosed in U.S. Pat. Nos. 3,404,869 and 3,751,377. The resultant mixture is injected into a mold where it is allowed to expand rapidly, filling the cavity in the mold and exerting a pressure of between 10 to 100 psi. External heating generally is unnecessary since the curing/foaming reaction is exothermic thereby providing sufficient heat. However, if necessary, the mold is maintained in the range of 40° F. to 250° F. by external temperature controls, e.g. by heating or cooling as is necessary.

First forming a fiber slurry in at least one major resin component and thereafter intimately mixing the slurry with the balance of the components of a foamable resin composition prior to foaming assures adequate wetting of the fibers by the resin component and thereby uniform distribution of the fibers throughout the foamable resin composition and, indeed, throughout the foamed article. Thus, the amount of fiber reinforcement per unit weight of resin is substantially constant throughout the foamed article. For example, a fiber-reinforced foam of this invention which has a high density skin and a low density core will hve substantially the same amount of fibers per unit weight of resin at any point throughout the skin and core; however, since the skin is a high density skin, a considerable fraction of the total amount of the fibers in the article will also be in the high density skin. Controlling the conditions of foaming by resin formulation and physical processing conditions thereby permits the formation of a fiber-reinforced foamed article which has a predetermined and substantially uniform ratio of fibers to resin throughout the article. Foams with low density cores and high density skins can be formed with as much as 90% of the fibers in the skin. In fabricating foams have substantially uniform densities over the core and skin, the fibers are more uniformly distributed in the skin and core. Thus, not only can low density high strength material be prepared by the instant process, but a broad range of fiber-reinforced foam materials can be prepared by simply altering processing variables as desired.

As indicated hereinbefore, the method of the present invention is particularly well suited to fabricating fiber-reinforced structural foams. Indeed, the method of the present invention is useful in fabricating thick structural foam boards, e.g. with thickness of up to 3 inches, and even greater. The randomly oriented and uniformly dispersed fiber filaments in the foams of the present invention, apparently eliminate the internal stresses of the prior art materials.

As will be appreciated, sheet reinforcing materials such as woven glass fabric, can be incorporated in articles prepared by the method of this invention. For example, a glass fabric can be inserted in the base of the mold prior to foaming the resin in accordance with this invention. Indeed, substantial improvement in the mechanical strength of the foam will result due to the "anchoring" of the fabric into the foam article by the randomly oriented fiber filaments.

Using glass fiber and polyurethane resin for illustration, the process is now described with reference to the schematic drawing. Staple fibers, in the form of fiber bundles are added via line 10 to a major resin component, in this case to a polyisocyante such as toluene diisocyanate or polymethylene polyphenylisocyanate, in a tank referenced in the drawing as numeral 12. As is shown by the dotted line, reference item 11, fibers can alternatively be added totally or partially to the second component of the resin composition. Preferably, however, the fibers are added to tank 12. The resin precursor and fibers are circulated through line 15 by means of a pump, such as an advancing cavity pump (not shown). Pumping is continued until at least some of the fibers are separated from the bundles into discrete fiber filaments and the fiber filaments and bundles are wet by the polyisocyanate. Indeed, at the point of wetting of the fibers, i.e. when the slurry becoms translucent, a substantial amount of the fibers are separated from the bundles. A separate vessel represented by 14 is provided for the polyol curing agent, such as those based on sorbitol or sucrose and the blowing agent, catalyst, optional fillers and surfactant. As indicated, fibers can be added to vessel 14 in which event pumping through line 20 is conducted to separate and wet out the fiber filaments. Approximate stoichiometric amounts of the polyisocyanate slurry from tank 12 and the polyol mixture from vessel 14 are metered and fed into a mixing head indicated generally as 16 via lines 17 and 19 respectively. From mixing head 16 the reactants are injected via line 21 to mold 18 where the reactants are foamed and cured.

Typical one-inch thick, 3 foot by 4 foot panels prepared in accordance with the instant invention have the properties listed in Table I below. For comparative purposes a non-fiber reinforced panel is included.

TABLE I

| Panel | Glass Content, % | Glass Distrib. | Density g/cc | Flexural Modulus | Flexural Strength |
|---|---|---|---|---|---|
| Low density | 10 | 80% in skin | .34 | 220,000 | 2800 |
| High density | 10 | uniform | .70 | 330,000 | 4000 |
| High density | 20 | uniform | .68 | 500,000 | 6500 |
| No reinforcement | None | — | .55 | 120,000 | 2800 |

The flexural strength and modulus were measured as ASTM test method D-790.

As can be seen from the foregoing, a low density fiber-reinforced foam with the reinforcing fibers concentrated in the skin has more advantageous properties even than a higher density non-reinforced foam panel.

Low density foams containing total fiber loadings of up to 50% have been prepared according to the process of this invention and with 90% of the fiber in the skin. The core density of these materials ranges generally from about 1 to 3 lbs/ft.$^3$, and the skin density from about 30 to 60 lbs/ft.$^3$.

As will be readily appreciated, the process of the present invention offers numerous variations. For example, if desired, the mold can also be lined with inserts and materials such as metal sheets or mats of woven or unwoven fibers, gauze and the like, metal foils, in such a manner that these inserts and materials will be incorporated in the high density fiber-reinforced plastic skin during molding. Indeed, foam boards of other thicknesses have been prepared in accordance with this invention. These boards had approximately 10% by weight of glass fiber based on the total weight of resin. A first layer of acrylic film was placed in the mold and a second layer of woven glass roving prior to introduction of the foam composition. The properties of these materials are set forth in Table II.

TABLE II

| Run No. | 1 | 2 | 3 | 4 | 5 | 6 | 8 | 10 |
|---|---|---|---|---|---|---|---|---|
| Thickness (in.) | 0.95 | 0.90 | 0.67 | 0.72 | 0.80 | 0.97 | 0.72 | 0.50 |
| Density lbs/cu.ft. | 29.9 | 34.0 | 35.3 | 37.2 | 37.5 | 38.8 | 42.3 | 60.0 |
| Flexural Strength PSL (ASTM D-790) | 410,000 | 400,000 | 530,000 | 470,000 | 600,000 | 580,000 | 720,000 | 1,100,000 |
| 3/8" Bolt Pull Test in lbs. .030" deflections | | | | | | | | |
| Double Shear | 840 | 570 | 580 | 710 | 800 | 510 | 900 | 960 |
| Ultimate | 2750 | 1620 | 1120 | 1700 | 1940 | 2800 | 2450 | 3400 |

What is claimed is:

1. A method of forming a foam article having a predetermined distribution of randomly oriented fiber filaments of staple length throughout the article and a substantially uniform weight ratio of fiber filaments to foam resin throughout comprising:
    (a) adding fibers of staple length to at least one major component of a foamable resin composition thereby forming a fiber slurry;
    b. pumping said slurry through a circulating line for a time sufficient to separate the fibers into discrete fiber filaments and to wet said fiber filaments with said major component while maintaining the structural integrity of said fiber filament thereby forming a substantially uniform dispersion of randomly oriented fibers in said component;
    c. mixing said dispersion with the balance of components necessary to form a foamable resin composition;
    d. thereafter allowing the resin composition to foam in an appropriate mold whereby a foam article is provided having a substantially uniform weight ratio of fiber filaments to foam resin throughout.

2. The method of claim 1 wherein the foamable thermoset resin is a polyurethane resin.

3. The method of claim 2 wherein the fiber is mixed with a polyisocyanate to form a fiber slurry, and said fiber slurry is mixed with a polyol, catalyst and blowing agent whereby said foamable polyurethane resin is obtained.

4. The method of claim 1 wherein the fiber is selected from the group consisting of glass, carbon, graphite, and boron fibers.

5. The method of claim 4 wherein the fiber is glass.

6. The method of claim 1 wherein the fiber is glass and is present in an amount greater than 10 wt. % based on the total weight of the resin.

7. In the method of forming a polyurethane foam article having a low density core and a high density skin from at least a two component polyurethane resin system, the improvement comprising adding glass fibers in the range from about 1 wt. % to about 50 wt. % of glass fibers based on the total weight of resin system to one of the two components; pumping said fibers and said component through a circulating line for a time sufficient to separate said fibers into discrete randomly oriented fiber filaments and to wet said fiber filaments with said component without destroying the structural integrity of said fibers thereby forming a substantially uniformly dispersion of said fibers in said component; mixing said dispersion with said second component whereby a foamable composition is obtained; allowing said foamable composition to form in a closed mold at a pressure of from about 10 psi to about 100 psi whereby a fiber-reinforced integral skin is formed on a fiber-reinforced core.

8. A method of forming a polyurethane foam article having a predetermined distribution of randomly oriented glass fiber filaments throughout the article and a substantially uniform weight ratio of fiber filaments to foam resin throughout comprising:

(a) adding to at least one major component of a foamable polyurethane resin composition glass fiber bundles in an amount ranging from about 1% to about 50 weight % based on the total weight of the polyurethane resin composition, thereby forming a fiber slurry, said fiber slurry, said fiber bundles consisting of a plurality of filaments in a bundle and said filaments being of staple length;

b. pumping said fiber slurry through a circulating line for a time sufficient to separate the fibers in the bundles into discrete fiber filaments and to wet said fiber filaments with said major component while maintaining the structural integrity of said fibers, thereby forming a substantially uniform dispersion of randomly oriented staple length glass fibers in said component;

c. mixing said dispersion with the balance of components necessary to form a foamable polyurethane resin composition;

d. thereafter allowing the resin composition to foam in an appropriate mold whereby said foam article has a substantially uniform weight ratio of fiber filaments to foam resin throughout.

* * * * *

UNITED STATES PATENT OFFICE
CERTIFICATE OF CORRECTION

PATENT NO. : 4,073,840
DATED : February 14, 1978
INVENTOR(S) : Glen E. W. Saidla It is certified that error appears in the above-identified patent and that said Letters Patent are hereby corrected as shown below:

In claim 8, line 11, "said fiber slurry," should be deleted.

Signed and Sealed this

Ninth Day of January 1979

[SEAL]

Attest:

RUTH C. MASON
Attesting Officer

DONALD W. BANNER
Commissioner of Patents and Trademarks